(12) United States Patent
Hamada

(10) Patent No.: US 9,227,813 B2
(45) Date of Patent: Jan. 5, 2016

(54) FLAT HARNESS WINDING DEVICE

(75) Inventor: Ryo Hamada, Susono (JP)

(73) Assignee: Yazaki Corporation, Tokyo (JP)

( * ) Notice: Subject to any disclaimer, the term of this patent is extended or adjusted under 35 U.S.C. 154(b) by 224 days.

(21) Appl. No.: 13/988,847

(22) PCT Filed: Nov. 21, 2011

(86) PCT No.: PCT/JP2011/077288
§ 371 (c)(1),
(2), (4) Date: May 22, 2013

(87) PCT Pub. No.: WO2012/070673
PCT Pub. Date: May 31, 2012

(65) Prior Publication Data
US 2013/0248632 A1    Sep. 26, 2013

(30) Foreign Application Priority Data

Nov. 24, 2010  (JP) ................................. 2010-260890

(51) Int. Cl.
| | |
|---|---|
| *H01R 3/00* | (2006.01) |
| *B65H 75/48* | (2006.01) |
| *H01R 35/02* | (2006.01) |
| *H02G 11/02* | (2006.01) |

(52) U.S. Cl.
CPC .............. *B65H 75/48* (2013.01); *H01R 35/025* (2013.01); *H02G 11/02* (2013.01)

(58) Field of Classification Search
USPC .................................................. 439/15, 164
IPC ..... H01R 35/02,35/025, 2201/26; B60R 16/027
See application file for complete search history.

(56) References Cited

U.S. PATENT DOCUMENTS

| | | | |
|---|---|---|---|
| 6,213,797 B1* | 4/2001 | Best et al. ...................... | 439/164 |
| 6,937,725 B2 | 8/2005 | Liao | |
| 2007/0184693 A1* | 8/2007 | Mitsui ............................ | 439/164 |
| 2009/0176393 A1* | 7/2009 | Asakura et al. ............... | 439/164 |

FOREIGN PATENT DOCUMENTS

| | | |
|---|---|---|
| CN | 2563136 Y | 7/2003 |
| DE | 10 2005 002 676 B3 | 6/2006 |
| EP | 0820125 A2 | 1/1998 |

(Continued)

OTHER PUBLICATIONS

International Search Report dated Dec. 27, 2011 and Written Opinion of the International Searching Authority, issued for PCT/JP2011/077288.

(Continued)

*Primary Examiner* — Hien Vu
(74) *Attorney, Agent, or Firm* — Locke Lord LLP

(57) ABSTRACT

A flat harness winding device includes: a case; a rotor rotatably disposed in the case; a shaft of the case inserted into a hole in the center of the rotor; a plurality of harness split rollers rotatably disposed in the rotor; and a plurality of flat harnesses each of which one end is fixed to the shaft, said flat harnesses independently bent along respective harness split rollers and guided out from an opening of the case allowed to be wound. Harness support rollers are rotatably disposed on the rotor in spaces between the harness split rollers. Curve-shaped harness guide ribs are disposed on the rotor close to an out side in a radial direction of each harness split roller.

4 Claims, 3 Drawing Sheets

(56) References Cited

FOREIGN PATENT DOCUMENTS

| | | |
|---|---|---|
| EP | 1878619 A1 | 1/2008 |
| JP | 11-116145 A | 4/1999 |
| JP | 2004-104899 A | 4/2004 |
| JP | 2004-328985 A | 11/2004 |
| JP | 2009-164005 A | 7/2009 |
| JP | 2010-074872 A | 4/2010 |

OTHER PUBLICATIONS

Supplementary European Search Report dated May 6, 2014, issued for the European patent application No. 11843753.2.

First Office Action dated Jun. 1, 2015 issued for corresponding Chinese patent application No. 201180056590.4.

* cited by examiner

FLAT HARNESS WINDING DEVICE

TECHNICAL FIELD

This invention relates to a flat harness winding device for winding up or extracting out a plurality of flat harnesses at the same time corresponding to a multi-circuit system.

BACKGROUND ART

FIG. 4 shows an embodiment of a conventional flat harness winding device.

This flat harness winding device 51 has a disc-shaped rotor 53 in a circular ring-shaped case 52. The rotor 53 is provided with a reverse roll 54 having a large diameter and a plurality of guide rolls 55 each having a small diameter both rotatably and pivotally supported. A flat harness (flat cable) 58 fixed to a circular wall 56 in the center of the case 52 with a clamp 57 is folded back along the reverse roll 54 via a circumference of the circular wall 56, curved along the guide rolls 55, and guided out freely from a guiding path 59 of the case 52. The rotor 53 is biased in a harness winding direction with a center coil spring 60.

One end of the coil spring 60 is fixed to a hollow shaft 61 in the center of the rotor 53, and the other end of the coil spring 60 is fixed to a slit 62 in the center of the case 52. The case 52 is composed of a lower case and an upper case. A fixed side 58a of the flat harness 58 is guided out from the other guiding path via the clamp 57. The fixed side 58a of the flat harness 58 is routed to a fixed body (not shown), and a movable side 58b of the flat harness 58 is routed to a movable body (not shown). Two flat harnesses 58 are laminated in a thickness direction. The number of the flat harnesses 58 is optional.

From a winding condition of the flat harness 58 shown in FIG. 4, when the movable side 58b of the flat harness 58 is extracted against the bias of the coil spring 60, the rotor 53 is rotated in the clockwise direction together with the rolls 55 and the reverse roll 54 rotates in the clockwise direction. Thereby, a flat harness portion around an outer periphery of the circular wall 56 is released, and the reverse roll 54 is moved close to the clamp 57 in the clockwise direction.

PRIOR ART DOCUMENT

Patent Document

Patent Document 1: JP, A, 2004-328985 (FIG. 1)

DISCLOSURE OF THE INVENTION

Problem to be Solved by the Invention

However, in the conventional flat harness winding device 51, because a plurality of the flat harnesses 58 is bent along the reverse roll 54 while laminated, a gap is generated between an inside bent flat harness $58_1$ and an outside bent flat harness $58_2$. Due to this gap, the inside bent flat harness $58_1$ is subject to slack, and to be buckled. When the inside bent flat harness $58_1$ is buckled, the flat harness 58 gets stuck with a buckled portion, and the flat harness 58 cannot be smoothly wound or extracted. Further, there is a fear that the buckled portion may be damaged.

Accordingly, in view of the above, an object of the present invention is to provide a flat harness winding device able to prevent a buckling caused by a gap between an inside bent flat harness and an outside bent flat harness when a plurality of the flat harnesses is used corresponding to a multi-circuit system.

Means for Solving the Problem

For attaining the object, according to the invention claimed in claim 1, there is provided a flat harness winding device comprising:

a case;
a rotor rotatably disposed in the case;
a shaft of the case inserted into a hole in the center of the rotor;
a plurality of harness split rollers rotatably disposed in the rotor; and
a plurality of flat harnesses each of which one end is fixed to the shaft, said flat harnesses being independently bent along respective harness split rollers and guided out from an opening of the case so as to be operatively wound.

According to the above configuration, each flat harness is guided to the opening of the case via each harness split roller from the center shaft. When the flat harnesses are extracted, the rotor is rotated in a harness extracting direction about the shaft, and each flat harness is released from the shaft and independently extracted along each harness split roller. When the flat harnesses are wound, the rotor is rotated in a harness winding direction due to restoring force of each flat harness, biasing force of a spring member, or a manual operation, and each flat harness is independently pulled back along each harness split roller and wound around the shaft. Thus, when the flat harnesses are extracted or wound, each flat harness independently abuts on an outer periphery of each harness split roller in a curve shape, thereby the gap between the inside bent flat harness and the outside bent flat harness is eliminated, and the buckling of the flat harness caused by the gap is prevented.

According to the invention claimed in claim 2, there is provided the flat harness winding device as claimed in claim 1, wherein harness support rollers are rotatably disposed on the rotor in spaces between the harness split rollers.

According to the above configuration, the flat harness disposed along the harness split roller from the shaft is guided to the opening via the harness support roller. Thereby, in the space between the harness split rollers, the flat harness is stably supported without slack. Further, the flat harness abutting on one harness split roller is prevented from abutting on the adjacent harness split roller, and a gap between the inside bent flat harness and the outside bent flat harness in the adjacent harness split roller is prevented from being generated. In this case, the harness support roller is disposed outer side in a radial direction of the rotor than the harness split roller.

According to the invention claimed in claim 3, there is provided the flat harness winding device as claimed in claim 1 or 2, wherein curve-shaped harness guide ribs are disposed on the rotor close to an out side in a radial direction of each harness split roller.

According to the above configuration, the flat harness routed along one harness split roller is guided out to the opening while slidingly abuts on the harness guide rib disposed outside of the adjacent harness split roller. Thereby, the flat harness abutting on one harness split roller is prevented from abutting on the adjacent harness split roller, and a gap between the inside bent flat harness and the outside bent flat harness in the adjacent harness split roller is prevented from being generated.

According to the invention claimed in claim 4, there is provided the flat harness winding device as claimed in any one of claims 1 to 3, wherein the harness split rollers are arranged at regular intervals.

According to the above configuration, each flat harness guided to the opening along each harness split roller from the center shaft adds the force equally in the extracting direction to each harness split roller arranged at regular intervals (regular angles) when extracting, and each harness split roller adds the force in the winding direction equally when winding. Therefore, the rotor is rotated smoothly, and the extracting or the winding of the flat harness is done smoothly with a small force.

According to the invention claimed in claim 5, there is provided the flat harness winding device as claimed in any one of claims 1 to 4, wherein the rotor includes: a substrate having the hole; and an outer peripheral wall, and wherein a spring member for biasing the rotor in a flat harness winding direction is disposed in an inside space of the outer peripheral wall.

According to the above configuration, the spring member is received compactly and in a space-saving manner by using the inner space of the rotor effectively, and the case, namely, the flat harness winding device is compactified in a height direction.

Effects of the Invention

According to the invention claimed in claim 1, when using a plurality of flat harnesses corresponding to a multi-circuit system, by arranging respective flat harnesses independently to respective harness split rollers, a gap between the inner bent flat harness and the outer bent flat harness at the harness split roller is prevented. Therefore, the buckling caused by the gap is prevented, an operability of extracting and winding the flat harness is increased, and a durability of the flat harness is increased. Further, because of no buckling, a clearance between the shaft and the harness split roller can be reduced, thereby the case, namely, the flat harness winding device is compactified in a radial direction.

According to the invention claimed in claim 2, the flat harness can be stably supported and guided by the harness support roller in between the harness split rollers.

According to the invention claimed in claim 3, the flat harness routed along the one harness split roller can be stably guided along the harness guide rib without slack and without abutting on the adjacent harness split roller. Further, a gap between the inner bent flat harness and the outer bent flat harness caused by abutting on the adjacent harness split roller is prevented. Thereby, an effect of claim 1 can be further advanced.

According to the invention claimed in claim 4, the flat harness can be smoothly and surely extracted or wound with a regular force by the harness split rollers arranged at regular intervals (regular angles).

According to the invention claimed in claim 5, by receiving the spring member in an inside space of the rotor, the case, namely, the flat harness winding device is compactified in a height direction.

DESCRIPTION OF EMBODIMENTS

Figures 1, 2:
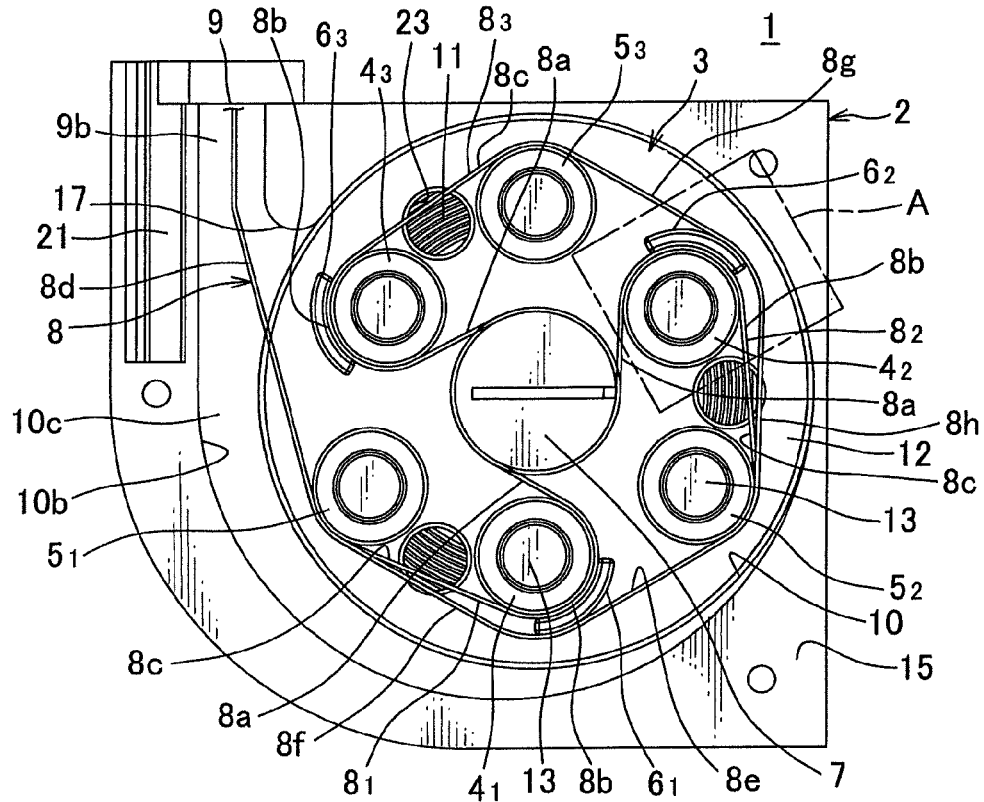
[FIG. 1] A plan view showing an inner structure of a flat harness winding device according to an embodiment of the present invention.
[FIG. 2] An enlarged plan view showing "A" portion (main part) of FIG. 1.
Figure 3:
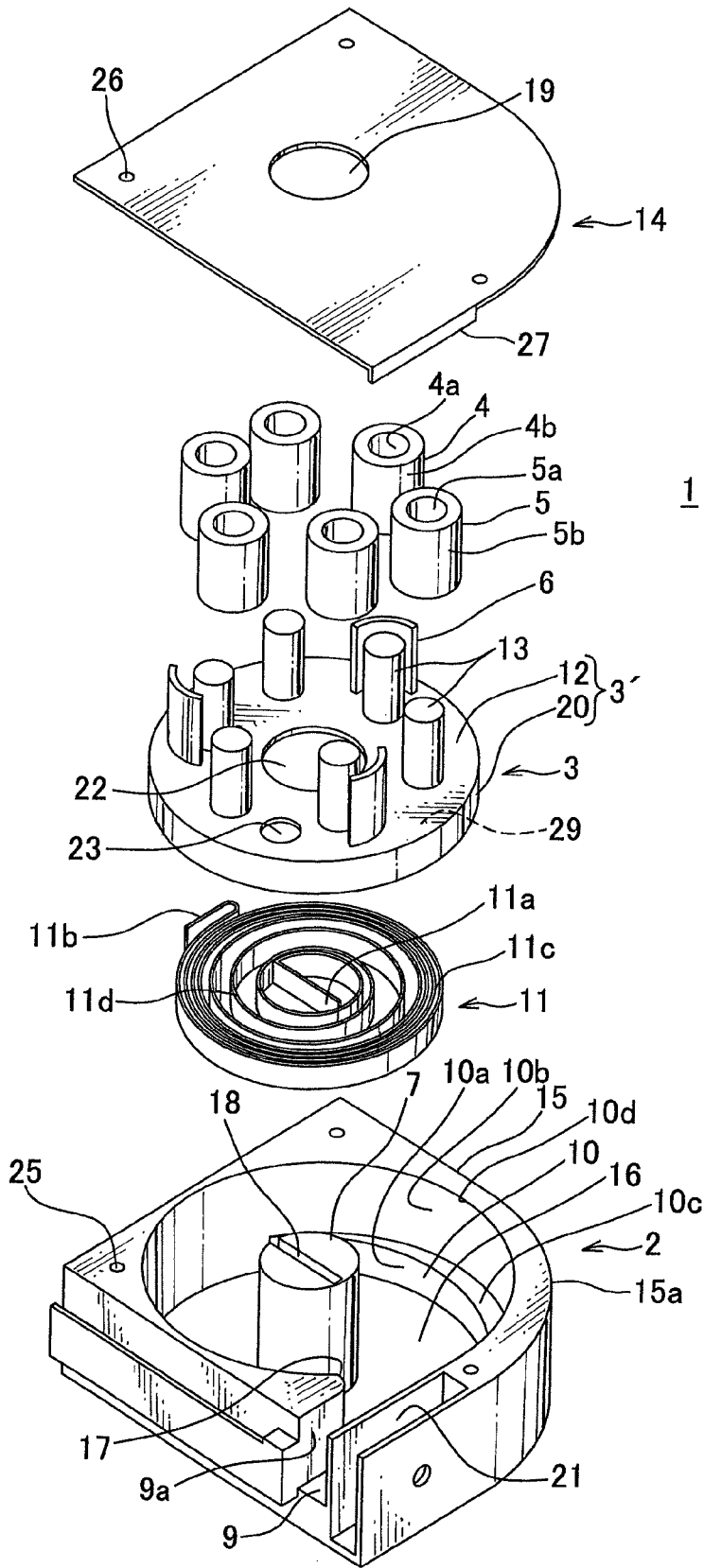
[FIG. 3] An exploded perspective view showing components of the flat harness winding device.
Figure 4:
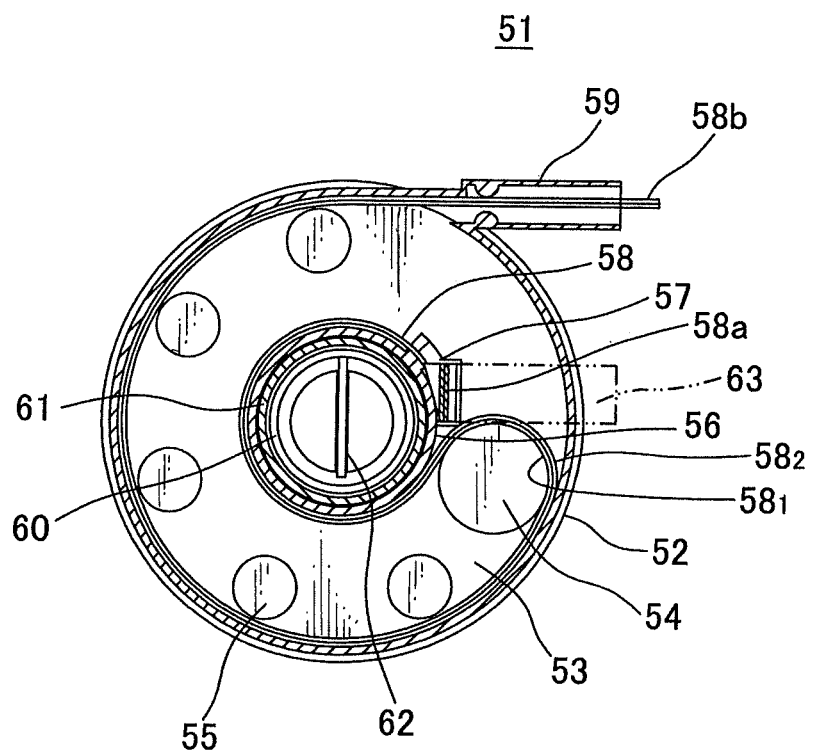
[FIG. 4] A transverse sectional view showing an inner structure of a conventional flat harness winding device.

FIGS. 1 to 3 show an embodiment of a flat harness winding device according to the present invention.

As shown in FIG. 1, this flat harness winding device 1 is provided with a rotatable circular rotor 3 in a synthetic-resin-made case 2. The rotor 3 alternately includes: a plurality of (three in this embodiment) harness split rollers 4 ($4_1$ to $4_3$); and a plurality of (three in this embodiment) harness support rollers 5 ($5_1$ to $5_3$). As shown in FIGS. 1 and 2, the rotor 3 further includes: curved harness guide ribs 6 ($6_1$ to $6_3$) each disposed at an outside of the harness split roller 4 in a radial direction. Each one end of three flat harnesses 8 ($8_1$ to $8_3$) is fixed to a shaft 7 located substantially the center of the case 2. While the flat harnesses 8 are independently folded along the harness split rollers 4, turned in a clockwise direction along the harness support rollers 5 and the harness guide ribs 6, and laminated together in a thickness direction, the flat harnesses 8 are guided out from an opening 9 of the case 2.

As shown in FIG. 3, the flat harness winding device 1 includes: the flat case 2; a spiral spring (spring member) 11 received in a concave 10 of the case 2; the rotor 3; the harness split rollers 4 and the harness support rollers 5 rotatably attached to shafts 13 projected from a circular substrate 12 of the rotor 3; a cover 14 covering the concave 10 of the case 2; and the plurality of flat harnesses 8 (FIG. 1).

The case 2 is formed in substantially a rectangular shape, and has a curved portion 15a as a part of a peripheral wall 15. A circular concave 10 is disposed on an inside of the peripheral wall 15. The concave 10 is surrounded by a bottom wall 16, a lower circular inner peripheral wall 10a, and an upper substantially circular inner peripheral wall 10b. The upper inner peripheral wall 10b is continued to the lower inner peripheral wall 10a via a step wall 10c. The opening 9 for guiding out the harness is formed on a part of the peripheral wall 15 in a tangential direction of the upper inner peripheral wall 10b. The cylindrical shaft 7 is integrally fixed to the center of the bottom wall 16, and extended vertically substantially the same height as an upper opening 10d of the concave 10. The shaft 7 has a larger diameter than the harness split rollers 4 and the harness support rollers 5 of the rotor 3.

One side wall 9a disposed at an inside of the opening 9 for guiding out the harness is continued to the inner peripheral wall 10b via a curved wall 17. A slit 18 for inserting and fixing an inner end 11a folded in a right angle of the spiral spring 11 is provided on the center of the shaft 7 vertically from an upper end to the bottom end.

For fixing the inner ends of the three flat harnesses 8 (FIG. 1), preferably, using the slit 18 of the shaft 7, while the inner ends of the three flat harnesses 8 are laminated together, they are folded in an L-shape in an orthogonal direction and inserted into the slit 18 and fixed to it. At the same time, an ascending folded portion (not shown) as a fixed portion of the flat harness 8 is guided out from the upper end of the slit 18 via a circular hole 19 of the cover 14. It is also possible that the inner ends of the flat harnesses 8 are separately inserted into three equally divided slits (not shown fixing portions) of the shaft 7 and fixed to them.

In any case, the ends of the fixed side of the flat harnesses 8 are guided out along the shaft 7, and connected to circuits of the power source or the like. The ends of the movable side of the flat harnesses 8 are guided out from the opening 9 of the case 2 and connected to the circuits at the load side.

The spiral spring 11 is received in a shallow concave 10 surrounded by the lower inner peripheral wall 10a of the case 2. The spiral spring 11 is covered by a hollow rotor main body 3' composed of the horizontal substrate 12 of the rotor 3, and a ring shaped outer peripheral wall 20 extended downward from an outer periphery of the substrate 12. Thereby, the spiral spring 11 is received compactly in a space-saving manner in an inner space 29 of the outer peripheral wall 20 of the rotor main body 3', and the outer peripheral wall 20 of the rotor main body 3' is disposed rotatably along the lower inner peripheral wall 10a of the case 2.

A folded outer end 11b of the spiral spring 11 is fixed to an inner end of the outer peripheral wall 20 of the rotor main body 3' by hooking or the like. The harness split rollers 4, the harness support rollers 5, and the guide ribs 6 of the rotor 3 are received in a deep concave 10 surrounded by the upper inner peripheral wall 10b in the case 2. For example, a harness guide member (not shown) or the like is attached to an outer groove 21 adjacent to the opening 9 of the case 2.

The spiral spring 11 is made by winding a band-shaped metal (spring steel) in a spiral shape, and has a property to be restored to a circular shape even if it is extended straight. In this embodiment, under a free condition, an outer spring portion 11c is wound tightly, and an inner spring portion 11d is wound loosely. A width of the spiral spring 11 is so small as to correspond to the flat concave 10 in the case 2. In FIG. 1, the spiral spring 11 biases the rotor 3 in a winding direction of the flat harness 8 (counterclockwise direction).

The rotor 3 is provided with a circular hole 22 at the center of the horizontal substrate 12 for inserting the shaft 7 of the case 2, and as shown in FIG. 1, a plurality of (three in total) holes 23 of a small diameter disposed in between the rollers 4, 5. The spiral spring 11 under the holes 23 and the winding condition of the spiral spring 11 can be seen through the holes 23. A plurality of (six in this embodiment) shafts 13 are extended vertically at regular intervals or substantially regular intervals on an upper wall of the substrate 12 in substantially the middle between the center hole 22 and the outer peripheral wall 20.

Preferably, the shafts 13 are molded integrally with the substrate 12 by synthetic resin material. The size and the shape of each shaft 13 are the same. Preferably, the rollers 4, 5 are formed in a cylinder shape, and made of synthetic resin having good sliding property. Each of the rollers 4, 5 includes: a hole 4a, 5a for inserting the shaft 13; an inner peripheral wall of the hole 4a, 5a; and an outer peripheral wall 4b, 5b coaxial to the inner peripheral wall. The size and the shape of each roller 4, 5 are the same.

The guide ribs 6 each having an arc-shaped cross section are close to the alternate three shafts 13 among the six vertical shafts 13 at an outside in a radial direction, and extended vertically from the substrate 12. As shown in FIG. 1, each guide rib 6 is positioned in an arc shape in a range from a vertical line (not shown) connecting the center of the center shaft 7 and the center of the outer shaft 13 to a position moved substantially ¼ round in a counterclockwise direction along an outer periphery of each harness split roller 4.

As shown in FIG. 2, each guide rib 6 is a curved plate or a curved wall having an arc-shaped inner peripheral wall 6a and an arc-shaped outer peripheral wall 6b, and integrally molded with the substrate 12 of the rotor 3. The inner peripheral wall 6a of the guide rib 6 is positioned along (close to) the outer peripheral wall 4b of the harness split roller 4. The flat harness 8 is folded near 180 degrees and inverted along the outer peripheral wall 4b of the harness split roller 4. A slight gap 24 is formed between the outer peripheral wall of the flat harness 8 and the inner peripheral wall 6a of the guide rib 6. The other outer flat harnesses 8 smoothly slide along the outer peripheral wall 6b of the guide rib 6.

The thin cover 14 shown in FIG. 3 is a part of the case 2, and preferably made of a metal plate. The cover 14 includes: a circular hole 19 for exposing an upper end of the center shaft 7; a small hole 26 for screwing a screw hole 25 provided on an upper wall of the peripheral wall 15 of the case 2; and a flange 27 for positioning the cover 14.

Each flat harness 8 shown in FIG. 1 is an existing one having good flexibility in a thickness direction in which a plurality of conducting portions (not shown) such as conductive line or conductive foil are held in a sandwich shape between insulating resin films. The flat harness 8 is short for a flat wiring harness, and also called as a flat cable.

As shown in FIG. 1, the three harness split rollers 4 are arranged at regular intervals of 120 degrees. As shown in FIG. 1, the flat harness 8 is wound in substantially ¼ round of the rotor 3. As shown in FIG. 1, a first flat harness $8_1$ is hooked shortly (the hooked portion is denoted as reference sign 8a) on a lower first harness split roller $4_1$ in a tangential direction from the center shaft 7, inverted near 180 degrees (the inverted portion is denoted as reference sign 8b), hooked on an adjacent first harness support roller $5_1$ in a clockwise direction (the hooked portion is denoted as reference sign 8c) directly supported in substantially U-shape by an outer peripheral wall of the first harness support roller $5_1$, and routed toward the opening 9 for guiding out (the routed portion is denoted as reference sign 8d). In reality, the routed portion 8d is guided out along a curved wall 17 at an inside of the opening (For convenience sake, the routed portion 8d is positioned in the center of a path 9b in the opening 9 in FIG. 1).

As shown in FIG. 1, a second flat harness $8_2$ is hooked shortly (the hooked portion is denoted as reference sign 8a) on an upper right second harness split roller $4_2$ in a tangential direction from the center shaft 7, inverted near 180 degrees (the inverted portion is denoted as reference sign 8b), hooked on an adjacent second harness support roller $5_2$ in a clockwise direction (the hooked portion is denoted as reference sign 8c) directly supported in substantially U-shape by an outer peripheral wall of the second harness support roller $5_2$, hooked on a first guide rib $6_1$ disposed at an outside of the adjacent harness split roller $4_1$ in the clockwise direction from the second harness support roller 52 (the hooked portion is denoted as reference sign 8e), hooked on the first harness support roller $5_1$ from the first guide rib $6_1$ (the hooked portion is denoted as reference sign 80, and routed toward the opening 9 (the routed portion is denoted as reference sign 8d) while overlapped with a curved outer side wall of the first flat harness $8_1$.

As shown in FIG. 1, a third flat harness $8_3$ is hooked shortly (the hooked portion is denoted as reference sign 8a) on an upper left third harness split roller $4_3$ in a tangential direction from the center shaft 7, inverted near 180 degrees (the inverted portion is denoted as reference sign 8b), hooked on an adjacent third harness support roller $5_3$ in a clockwise direction (the hooked portion is denoted as reference sign 8c), directly supported in substantially U-shape by an outer peripheral wall of the third harness support roller $5_3$, hooked on a second guide rib $6_2$ disposed at an outside of the adjacent harness split roller $4_2$ in the clockwise direction from the third harness support roller $5_3$ (the hooked portion is denoted as reference sign 8g), hooked on the second harness support roller $5_2$ from the second guide rib $6_2$ (the hooked portion is denoted as reference sign $8h$), hooked on the first guide rib $6_1$ disposed at an outside of the adjacent first harness split roller $4_1$ in the clockwise direction while overlapped with a curved outer side wall of the second flat harness $8_2$ (the hooked portion is denoted as reference sign $8e$), hooked on the first harness support roller $5_1$ together with the two flat harnesses $8_1$, $8_2$ (the hooked portion is denoted as reference sign $8f$), and routed toward the opening 9 (the routed portion is denoted as reference sign $8d$).

As shown in FIG. 1, the flat harness 8 is not hooked on a third guide rib $6_3$ disposed at an outside of the third harness split roller $4_3$. When the rotor 3 is rotated in a counterclockwise direction (winding direction) by force of the spiral spring 11, the flat harnesses 8 are hooked on the third guide rib $6_3$ from the first harness support roller $5_1$ while overlapped with each other. At the same time, the flat harnesses 8 are wound in the counterclockwise direction along the outer peripheral wall of the center shaft 7. Corresponding to a setting amount of the pulling out length of the flat harnesses 8, the flat harnesses 8 are wound one or more round along the outer peripheral walls of the guide ribs 6 while overlapped with each other, and at the same time, the flat harnesses 8 are wound along the outer periphery of the shaft 7. "First to third" is for convenience sake.

The guide rib 6 separates a harness portion along the outer peripheral wall of the harness split roller 4 (for example, $8c$) and a harness portion along the outer peripheral wall of the guide rib 6 (for example, $8f$) to prevent both harness portions (for example, $8c$ and $8f$) from contacting each other and from friction caused by contacting, and makes both harness portions being wound or pulled out smoothly with a small sliding resistance. An end $6c$ (FIG. 2) in a clockwise direction of the guide rib 6 is located in front of a contact 28 (FIG. 2) between the roller 13 and the harness portion $8c$ in the counterclockwise direction so as not to interfere with the harness portion (for example, $8c$) pulled out in the tangential direction from the harness split roller 4.

When the flat harnesses 8 are further pulled out from the opening 9 against the biasing force of the spiral spring 11 from a condition shown in FIG. 1, the rotor 3 is rotated in the clockwise direction, and the first harness support roller $5_1$ is rotated in the clockwise direction together with the rotor 3 so that the flat harnesses 8 are moved outside from the first harness support roller $5_1$ in the radial direction. When the first harness split roller $4_1$ is moved close to the opening 9, the first flat harness $8_1$ disposed along the first harness split roller $4_1$ is pulled toward the opening 9 together with the other flat harnesses 8, and the further rotation of the rotor 3 is prevented. FIG. 1 shows a condition that the flat harnesses 8 are just before fully pulled out.

According to the flat harness winding device 1 described above, because the rotor 3 is provided with the plurality of harness split rollers 4, and the flat harnesses 8 are independently routed in the harness split rollers 4, a gap between the inside bent flat harness 8 and the outside bent flat harness 8 (a tip of the outside bent flat harness 8 is behind a tip of the inside bent flat harness 8) is not generated, and the buckling of the flat harness caused by the gap is prevented. Thereby, the extracting or the winding of the flat harness is done smoothly without any catch, and a damage of the flat harness 8 caused by the buckling is also prevented.

By increasing the number of harness split rollers 4 such as two or three (In FIG. 1, the number of the harness split rollers 4 is three), the flat harness winding device 1 can correspond to the multi-circuit system of the connecting side (load side or the like) without buckling. Further, because the flat harness 8 is prevented from buckling at the harness split roller 4, and prevented from buckling when the flat harness 8 is wound around the center shaft 7, a clearance between the shaft 7 and the harness split roller 4 can be small (When the flat harness 8 buckles, a bucking portion cannot be passed without a large clearance), and the case 2, namely, the whole flat harness winding device 1 can be compactified in a radial direction.

Incidentally, other flat routing material such as a flat-shaped optical fiber can be used instead of the flat harness 8. In this case, the flat routing material cannot be folded at the shaft 7 side. The flat harness 8 can be referred to as the flat routing material. This invention can be used in a flat routing material winding mechanism or a flat routing material winding structure other than the flat harness winding device 1.

Further, in the embodiment described above, when the number of the flat harnesses 8 is four, four harness split rollers 4 are arranged at regular intervals on the rotor 3, and four harness support rollers 5 are arranged between the harness split rollers 4. Preferably, the harness support rollers 5 are arranged at regular intervals, however, an interval between the harness split roller 4 and the harness support roller 5 adjacent to each other can be set properly.

When the number of the flat harnesses 8 is two, two harness split rollers 4 are arranged at regular intervals, and two or more harness support rollers 5 are arranged between the harness split rollers 4. Alternatively, two of the tree harness split rollers 4 shown in FIG. 1 can be used (the remaining one is not used).

When the number of the flat harnesses 8 is large, for example, six, two flat harnesses 8 each can be laminated on the tree harness split rollers 4. In this case, a gap is generated between an inside bent flat harness and an outside bent flat harness, however, it is effective to correspond to the more multi-circuit system (the gap is smaller than a case that six flat harnesses 8 are laminated). The harness split roller 4 serves to split the plurality of flat harnesses 8 into one flat harness 8 each to be arranged.

Further, in FIG. 1, it is also possible to omit (remove) the harness support rollers 5, and to support the flat harnesses 8 guided out from the harness split rollers 4 by the guide ribs 6 outside of the adjacent harness split rollers 4. In particular, when the number of the flat harnesses 8 is large, namely, the number of the harness split rollers 4 is large (the number of the flat harnesses 8 is equal to the number of the harness split rollers 4), an arranging space for the harness split rollers 4 can be secured by omitting the harness support rollers 5.

Further, in FIG. 1, it is also possible to omit guide ribs 6 and arrange the harness split rollers 4 close to the center shaft 7, arrange the harness support rollers 5 away from the shaft 7 and near the outer periphery of the rotor 3, and for example, while the second harness support roller $5_2$ supports the flat harness $8_2$ guided out from the second harness split roller $4_2$, the flat harness $8_2$ may be passed the first harness split roller 41 without any contact and supported by the first harness support roller $5_1$. This is particularly effective when the number of the harness split rollers 4 is large (the harness split rollers 4 are close to each other).

Further, as the spring member, a flat-shaped coil spring or the like can be used instead of the spiral spring 11. Further, it is also possible to omit the spring member, and to rewind the flat harness 8 by restoring force caused by the stiffness of the flat harness 8 (only a case that a pulled out length of the flat harness 8 is short).

INDUSTRIAL APPLICABILTY

A flat harness winding device according to the present invention corresponds to a multi-circuit system of an auxiliary device or the like of a vehicle or the like by laminating a plurality of flat harnesses. Further, the flat harness winding device prevents the flat harness from backing when winding or pulling out the flat harness and can be used to increase winding operability and pulling out operability, and to increase reliability of constant power supply to the auxiliary device or the like.

REFERENCE SIGNS LIST 1 flat harness winding device
2 case
3 rotor
4 harness split roller
5 harness support roller
6 harness guide rib
7 shaft
8 flat harness
9 opening
11 spiral spring (spring member)
12 substrate
20 outer peripheral wall
22 hole

The invention claimed is:
1. A flat harness winding device comprising:
a case;
a rotor rotatably disposed in the case;
a shaft of the case inserted into a hole in the center of the rotor;
a plurality of harness split rollers rotatably disposed in the rotor;
a plurality of harness support rollers rotatably disposed in the rotor in spaces between the harness split rollers; and
a plurality of flat harnesses each of which one end is fixed to the shaft, said flat harnesses being independently bent along respective harness split rollers and guided out from an opening of the case so as to be operatively wound,
wherein the rotor includes: a substrate having the hole; and an outer peripheral wall, and wherein a spring member for biasing the rotor in a flat harness winding direction is disposed in an inside space of the outer peripheral wall.

2. The flat harness winding device as claimed in claim 1, wherein curve-shaped harness guide ribs are disposed on the rotor close to an out side in a radial direction of each harness split roller.

3. The flat harness winding device as claimed in claim 1, wherein the harness split rollers are arranged at intervals of approximately equal angularity with respect to a center of the shaft of the case.

4. The flat harness winding device as claimed in claim 2, wherein the harness split rollers are arranged at intervals of approximately equal angularity with respect to a center of the shaft of the case.

* * * * *